United States Patent [19]

Barker et al.

[11] Patent Number: 5,194,863

[45] Date of Patent: Mar. 16, 1993

[54] TOUCH PANEL DISPLAY

[75] Inventors: John H. Barker, Delray Beach; Ernesto LeFranc; Donald D. Williams, both of Boca Raton, all of Fla.

[73] Assignee: International Business Machines Corporation, Armonk, N.Y.

[21] Appl. No.: 789,384

[22] Filed: Nov. 6, 1991

Related U.S. Application Data

[63] Continuation of Ser. No. 335,265, Apr. 10, 1989, abandoned.

[51] Int. Cl.$^5$ .................... G08C 21/00; G01V 9/04
[52] U.S. Cl. ..................................... 341/31; 340/712; 250/221; 250/222.1
[58] Field of Search .................. 341/31; 340/711, 712; 250/221, 222.1

[56] References Cited

U.S. PATENT DOCUMENTS

| | | | |
|---|---|---|---|
| 4,243,879 | 1/1981 | Carroll et al. | 250/221 |
| 4,301,447 | 11/1981 | Funk et al. | 340/365 |
| 4,386,232 | 5/1983 | Slater | 178/18 |
| 4,645,920 | 2/1987 | Carroll et al. | 250/221 |
| 4,652,741 | 3/1987 | Golborne | 250/221 |
| 4,684,801 | 8/1987 | Carroll et al. | 250/221 |
| 4,703,316 | 10/1987 | Sherbeck | 340/712 |
| 4,719,339 | 1/1988 | Mizuno | 250/221 |
| 4,761,637 | 8/1988 | Lucas et al. | 340/365 |
| 4,799,044 | 1/1989 | Masters et al. | 340/712 |
| 4,841,290 | 6/1989 | Noukano et al. | 340/712 |
| 4,904,857 | 2/1990 | Ando et al. | 340/712 X |
| 4,905,174 | 2/1990 | Ouchi | 340/712 X |
| 4,928,094 | 5/1990 | Smith | 250/221 X |

OTHER PUBLICATIONS

Mitra; "An Introduction to Digital and Analog Integrated Circuits and Applications", 1980, pp. 124–125.
IBM TDB, vol. 29, No. 10, Mar. 1987, pp. 4537–4539.

*Primary Examiner*—Donald J. Yusko
*Assistant Examiner*—Michael Horabik
*Attorney, Agent, or Firm*—Romualdas Strimaitis

[57] ABSTRACT

A system which can control a plurality of opto-matrix input devices. Each opto-matrix device uses multiplexed scanning of emitter/detector pairs under control of a separate computer. The output of the opto-matrix input device is analog data which is provided to the computer for conversion to digital by the computer. The computer then determines if a stylus is located in the opto-matrix field, and if so, determines the stylus location by analysis of the received data.

8 Claims, 4 Drawing Sheets

TOUCH PANEL DISPLAY

This is a continuation of co-pending application Ser. No. 07/335,265 filed on Apr. 10. 1989 now abandoned.

BACKGROUND OF THE INVENTION

1. Technical Field

The present invention relates to touch input devices. In particular, to opto-matrix frames having a minimum component count.

2. Background Art

Historically, keyboards were used to interact with display devices. Due to the needs of particular users, a number of alternative methods of interacting with display devices were developed. Included in the alternatives were items such as mice, light pens, tablets, joysticks, and the like. All of these methods have the disadvantage of requiring hardware extraneous to the display. The development of touch panel displays provided an alternative method of interacting with a display device which has the additional advantage of not requiring hardware extraneous to the display. Touch panel displays allow a user to interact with by first presenting information on the screen. Then the user interacts by touching the screen at locations based on information displayed on the screen. The touch panel senses the location of the finger or stylus and communicates that information to the computer.

There are known alternative methods of designing touch panel displays. One method uses a transparent membrane switch which covers the surface of the display screen. Over time, the membrane design creates vision problems for the user. This is because the membrane lies directly over the screen. Therefore, membrane wear will have a direct effect on how well a user can see the display. A preferable method is the opto-matrix display. This type of touch panel display places nothing on the surface of the screen, eliminating the problems caused by membrane wear. Further, the frequency of energy used can be selected so that it is outside of the visible light range, thereby rendering the matrix invisible to the user.

However, a disadvantage associated with opto-matrix touch panel displays is the high component count and consequent high manufacturing expense. For example, a large number of light emitting diodes (emitters) are required to create the optical matrix. A correspondingly large number of detectors, paired with corresponding emitters, are required to detect light, or its absence, in the matrix. Further, scanning the emitters and monitoring the detectors typically requires significant on-board processing capability to scan the emitter/detector pairs, measure the difference between detector output before and after the emitter is turned on, and determine if a stylus is present at a given location. Touch panel displays also include digital to analog converters to allow data to be converted prior to being transferred to computers.

The prior art has failed to provide a touch panel input device that not only has the known advantages of opto-matrix displays, such as the absence of extraneous hardware, and the superior visual qualities of opto-matrix touch panels over membrane touch panel input devices, but one which also overcomes the disadvantages of known opto-matrix touch panel devices, which results in high cost primarily due to the number of components required to implement such a device.

SUMMARY OF THE INVENTION

It is an object of this invention to reduce the number of components in an opto-matrix input device.

It is another object of this invention to control internal multiplex scanning of emitters and detectors in an opto-matrix input device from external computer logic.

It is a further object of this invention to convert analog signals from an opto-matrix input device after the signals are outputted from the opto-matrix input device to a computer.

It is yet another object of this invention to control multiplex scanning of emitters and detectors in a plurality of opto-matrix input devices with a single computer.

It is still another object of this invention to convert analog signals, produced by a plurality of opto-matrix input devices, in a single computer.

It is still a further object of this invention to compare ambient data with active emitter data in opto-matrix input devices after the data is outputted from the opto-matrix input device to a computer.

It is another object of this invention to amplify analog signals of an opto-matrix input device prior to outputting them to a computer.

These and other objects are accomplished by a system which uses the processing capacity of a computer to drive the multiplexed scanning of one or more opto-matrix input devices, and to input analog data produced by the scanning to a computer which converts the analog data to digital and compares the data with ambient reference values to detect the presence of a stylus in an opto-matrix field. The use of an analog to digital converter and multiplex control logic in the computer allows the numerous components required for those functions in a plurality of opto-matrix input devices to be replaced with a single set of components while maintaining the same functional capability.

DESCRIPTION OF THE PREFERRED EMBODIMENT

For ease of discussion, the following terms will be used in this disclosure. The term "opto-matrix input device" will be used interchangeably with the term "touch panel," and the term "opaque point" will be used interchangeably with the term "stylus." A stylus can be anything used to block the energy beam between an emitter and a detector, such as a finger, pencil, or the like.

Figure 1:
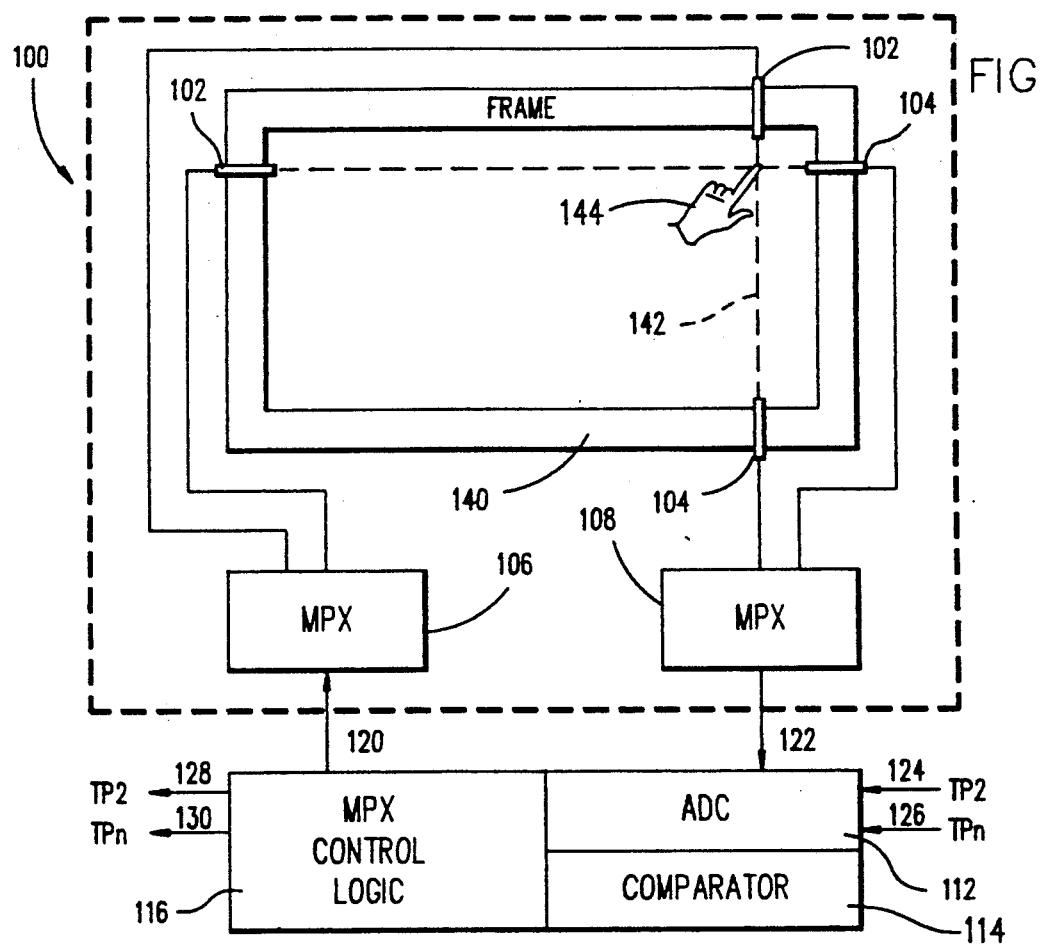
FIG. 1 is a functional block diagram showing the location of the major elements of the invention in a system having an opto-matrix input device and a separate computer.

Referring to FIG. 1, the general overview of the operation and control of the system can be seen. For purposes of clarity, only a single touch panel 100 is shown and described. The capability of attaching a plurality of similar touch panels is indicated by the additional emitter and detector selection control signal lines 128, 130 exiting to touch panels 2-n, and the additional analog signal data lines 124, 126 entering the analog to digital converter (ADC) 112 in the computer 110. In this case, an analog multiplexor or multiple ADC's would have to be used.

The computer 110 generates emitter and detector selection control signals in the multiplex control logic 116 and transmits them on lines 120 to multiplexors 106, 108 (MPX) in touch panel 100. Under control of the emitter and detector selection control signals, the multiplexors 106, 108 selectively activate the emitters 102 and detectors 104 in the frame 140 of touch panel 100, thereby creating an energy matrix. The detectors 104 produce an analog signal. The analog signal varies depending on the presence or absence of a stylus 144 in the beam path 142 of the emitter/detector pair selected by the multiplexors 106, 108 from the emitters 102 and detectors 104. The multiplexor 108 controls the outputting of the analog signal data on line 122 to the ADC 112 in the computer 110. The ADC 112 converts the analog signal data on line 122 to a digital value. The digital value is compared to an ambient reference value stored in the comparator 114. For ease of illustration, the comparator 114 is treated as a physical device. However, in the preferred embodiment the comparator 114 function is implemented by a computer program. Likewise, storage used to hold the ambient reference value would also be in computer storage used by the computer program. The value represents the output level of the detector 104 when its corresponding emitter 102 is off. Therefore, if a stylus is blocking the energy beam between an emitter and its corresponding detector, it will be indicated by an equal comparison. On the other hand, if the beam is not obstructed, the resulting unequal comparison indicates the absence of a stylus. The ambient reference value can be a preselected value. It can also be dynamically measured by first activating a detector with all emitters turned off, then scanning with its corresponding emitter on, and then comparing the results. The dynamic method permits tracking of individual emitter/detector pair performance, and further, allows for variations in ambient conditions which a static reference value would not address. The multiplex control logic 116, the ADC 112 and the comparator 114 perform the same functions for each of the plurality of touch panels connected to the computer.

Figure 2:
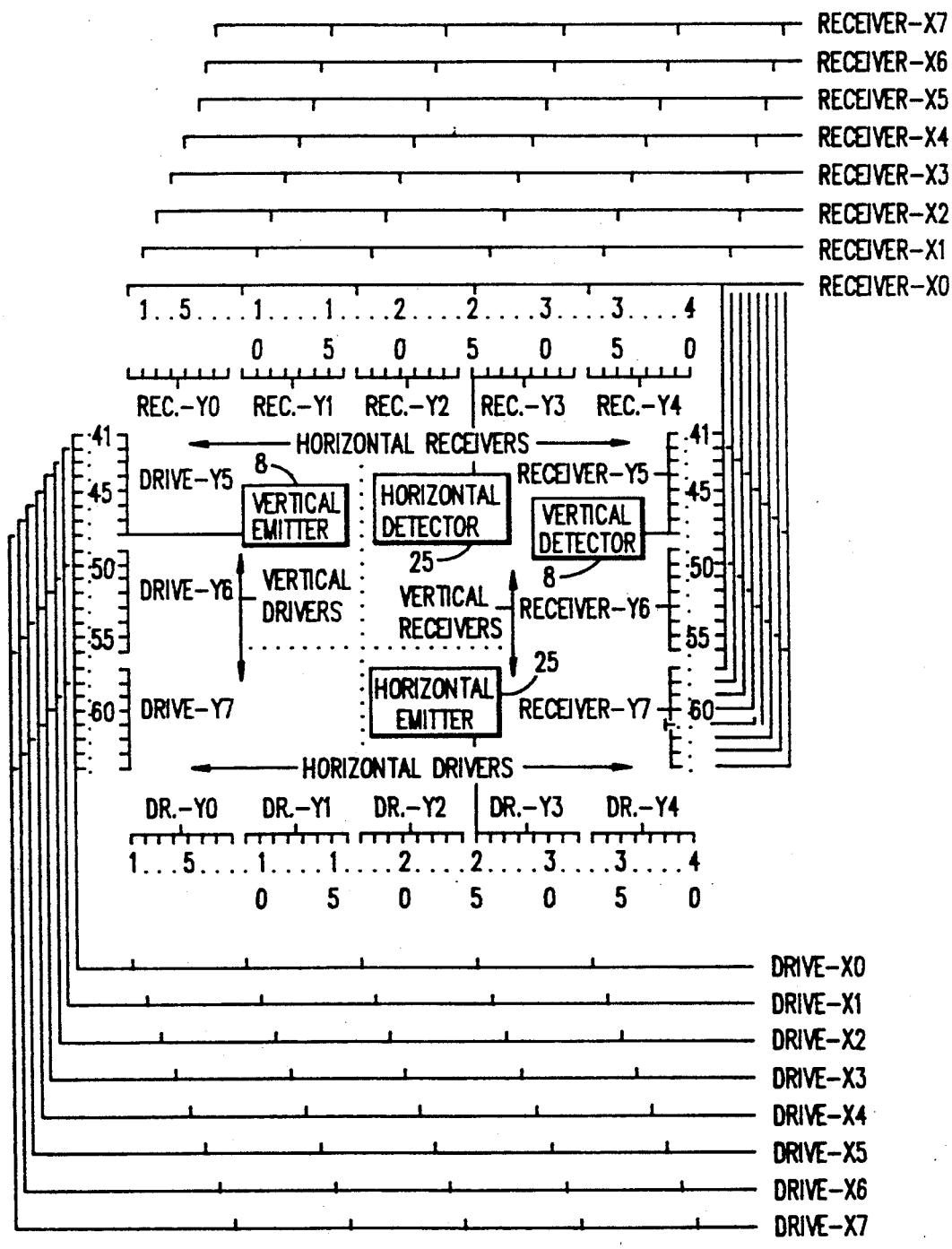
FIG. 2 shows a diagram of the basic multiplexing scheme used in the invention.

FIG. 2 shows the multiplexing scheme used for a touch panel in the preferred embodiment. Selection is accomplished by turning on a single emitter driver, either horizontal or vertical, and then reading the corresponding detector receiver to determine which are illuminated and which are obscured. To illuminate an emitter, an X and Y select must be activated and the drivers must be enabled. For example, to illuminate horizontal emitter 25, drive Y3 and X0 must be turned on. To illuminate vertical emitter 8, turn on drive Y5 and X7. The X and Y drives are generated by 3 to 8 multiplexors (FIG. 4, discussed below, shows a 3 to 8 multiplexor).

Figure 3:
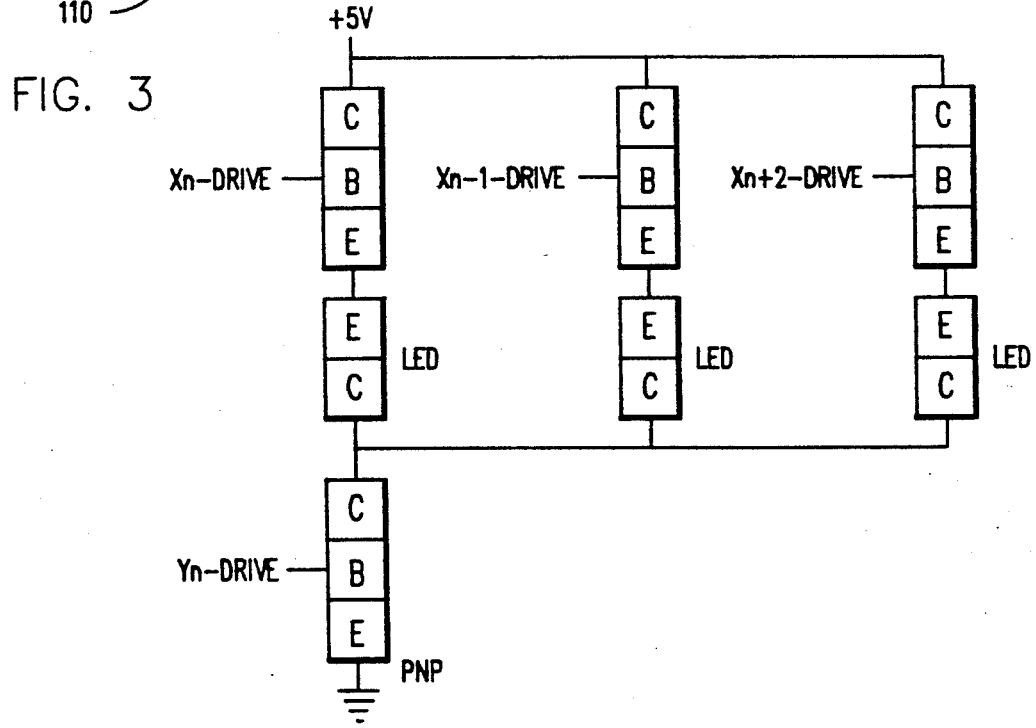
FIG. 3 shows an example of a driver circuit used to activate an emitter.

FIG. 3 shows in greater detail an equivalent circuit used to activate emitters. A single Y drive is used to enable a group of X drives. For purposes of illustration, the group was limited to three X drives. When both a Y and an X drive are present, the corresponding emitter is enabled.

Figure 4:
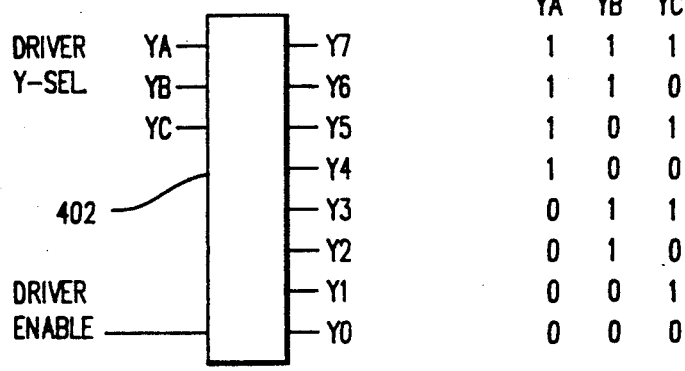
FIG. 4 shows a multiplexor used for emitter selection.
Figure 4:
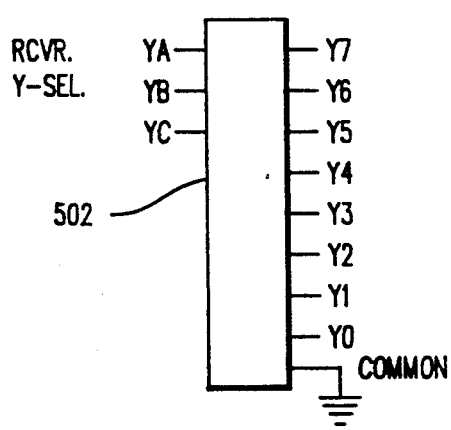

FIG. 4 shows the 3 to 8 multiplexors 402 and 404 which comprise multiplexor 106 and corresponding logic table used in the preferred embodiment for the Y and X emitter drives, discussed above in FIG. 2. The input signals YA, YB, YC, XA, XB, XC, and the Driver Enable Lines are the emitter selection control signals shown entering the touch panel on line 120 of FIG. 1. The outputs Y0-Y7, and X0-X7 are the emitter driver selection lines Y0-Y7, and X0-X7 shown in FIG. 2. The multiplexors are well known in the art.

Figure 5:
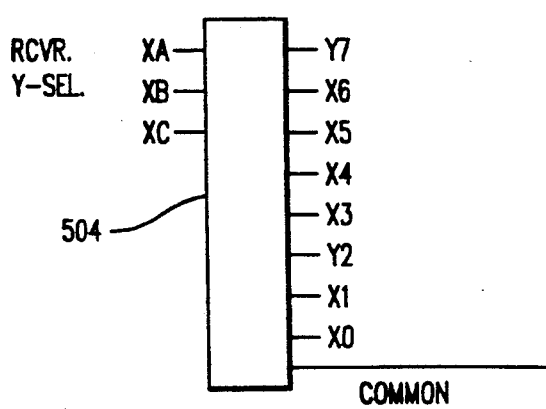
FIG. 5 shows a multiplexor used for detector selection and its relationship to the ADC converter.
Figure 5:
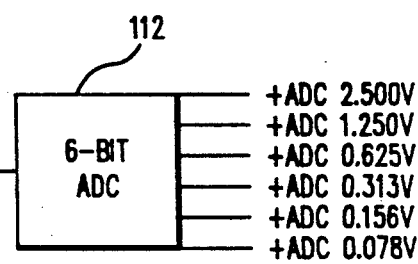

FIG. 5 shows the detector (receiver) multiplexor 502 and 504 which comprise multiplexor 108. The receivers are multiplexed similar to the drivers but use analog switches in place of the driver transistors. Analog switches are well known in the art. The Y select is latched by a 3 to 8 analog multiplexor and completes the ground path for the receiver. The X select is also latched by a 3 to 8 analog multiplexor and selects a unique receiver to be sensed. The input signals YA, YB, YC, XA, XB, XC, are the detector selection control signals shown entering the touch panel on line 120 of FIG. 1. The outputs Y0-Y7, and X0-X7 are the detector driver selection lines Y0-Y7, and X0-X7 shown in FIG. 2. The analog data signal output by the receiver is transmitted to the ADC 112 in the computer 110.

Figure 6:
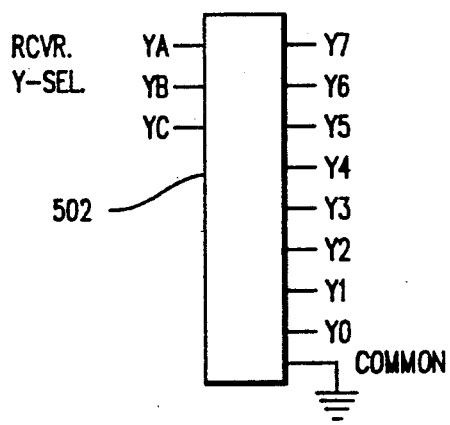
FIG. 6 shows an alternative embodiment of a multiplexor used for detector selection, which includes an amplifier on the output of the detectors.
Figure 6:
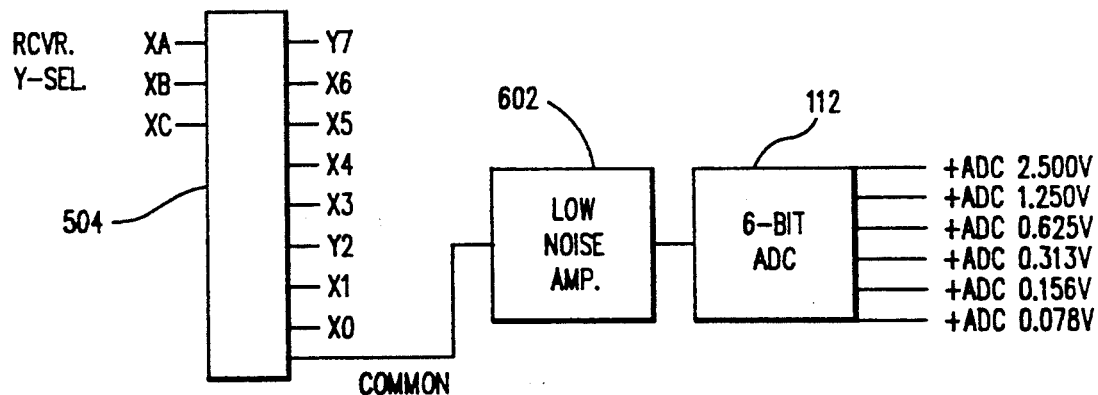

FIG. 6 is an alternate embodiment of the device shown in FIG. 5. The difference being the addition of an analog amplifier 602. The output of multiplexors 502 and 504 which comprise multiplexor 108 is input to amplifier 602. The output of amplifier 602 is input to ADC 12 of computer 110. The use of amplifier 602 allows amplification of the signal prior to outputting to the ADC 112. The amplifier can be used to compensate for changes in ambient energy conditions based on changes in the ambient reference value calculated by the computer. In the preferred embodiment, the amplifier is a high input impedance, low noise amplifier.

Referring again to FIG. 1, stylus detection is accomplished by using the ADC 112 in computer 110. The appropriate detector 104 is selected and all emitters 102 are turned off. The ambient energy level is sensed and converted to digital by the ADC 112. The ambient value is stored as an ambient reference value in the comparator 114 (shown in FIG. 1). The emitter 102 corresponding to the selected detector 104 is turned on and read by the selected receiver. The ADC 112 is again used to determine the energy level. This new level is compared by the comparator 114 (shown in FIG. 1) to the ambient reference value to determine if a detector 104 is obscured, indicating the presence of a stylus. In the preferred embodiment, the output of the ADC 112 is approximately full scale when the detectors 104 are obscured. Errors are possible due to variations in ambient energy conditions. For example, an unobscured detector might produce a high value during generation of the ambient reference value. Then, if the ambient energy is reduced prior to the activation of the emitter, a lower value would be measured even though the detector was still unobscured. The comparison of the two values would then falsely indicate the presence of a stylus. To avoid errors due to changes in ambient background illumination, the computer 110 adjusts the ambient reference value downward by an amount large enough to avoid this problem. In the preferred embodiment, approximately 20 percent is used, but this value is not critical and can be changed due to choice of component values, etc.

Figure 7:
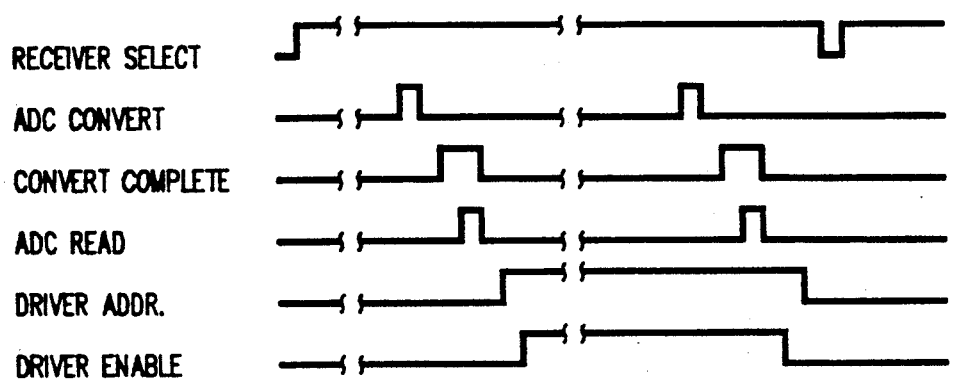
FIG. 7 is a scan timing diagram showing the relationship between the measurement of the ambient state and measurement of the active emitter states of the invention.

FIG. 7 illustrates scan timing. Actual timing values are not shown since they are mere design choices based on the quality of the components selected. First, all of the emitter 102 drivers are turned off. A delay is used to allow the receivers to detect the ambient energy level. Next, the ADC 112 (shown in FIG. 1) converts the receiver output to digital. Then the output is read and saved for reference. After the output is saved, the driver corresponding to the selected receiver is addressed and enabled. Another delay is used to allow the receiver to detect the change in energy level. Then, the ADC 112 converts the new receiver output to a digital value. The value is then compared to the ambient reference value. A lower receiver output indicates an unobscured area while a value that is equal to or greater than the reference is obscured.

After the obscured pairs of vertical and horizontal emitters 102 and detectors 104 are detected, the computer can calculate the physical location of the stylus by known means.

While the invention has been described with respect to a preferred embodiment thereof, it will be understood by those skilled in the art that various changes in detail my be made therein without departing from the spirit, scope, and teaching of the invention. For example, although a 3 to 8 multiplexor was used in the preferred embodiment, it could be replaced with other multiplexing techniques well known in the art. The percentage of signal reduction used for the ambient reference signal could be varied over a wide range during the design stage to account for component selection, or even dynamically by the computer 110 to account for changes in ambient conditions over the course of time. The storage used for the ambient reference value could be in a separate physical storage rather than a part of the computer storage used by the comparator 114. Also, all of the detectors could be scanned for ambient reference values prior to activating any emitter. An amplifier can be added to the detector output as it was in the alternative embodiment shown in FIG. 6. Accordingly, the invention herein disclosed is to be limited only as specified in the following claims.

We claim:

1. An opto-matrix input device with a reduced number of driver components for detecting and communicating to a computer the position of an opaque point within a predetermined field, the apparatus comprising:
    a frame, the frame having a first vertical side, a second vertical side, a first horizontal side and a second horizontal side;
    a plurality of Y emitter drivers for activating preselected groups of emitters;
    a plurality of X emitter drivers for activating preselected groups of emitters;
    a plurality of emitters, each requiring input from an active Y emitter driver and an active X emitter driver to emit energy, the emitters attached to the first horizontal side and the first vertical side such that energy beams from the emitters form a matrix;
    a plurality of detectors, each of the detectors corresponding to and paired with one of the plurality of emitters, the detectors attached to the second horizontal side and the second vertical side such that an energy beam from each of the corresponding emitters is detected by the detector which is paired with the corresponding emitter;
    emitter multiplexing means, the emitter multiplexing means having means to receive emitter selection control signals input to the emitter multiplexing means by the computer, the emitter multiplexing means electrically interconnected to the Y emitter drivers and X emitter drivers for selective activation of energy emission from the emitters under control of the emitter selection control signals, the emitter multiplexing means further including Y emitter multiplexor means and X emitter multiplexing means for selecting Y emitter drivers and X emitter drivers interconnected to the emitters such that each emitter in the group selected by the Y emitter driver has a different X emitter driver associated with it;
    detector multiplexing means, the detector multiplexing means having means to receive detector selection control signals input to the detector multiplexing means by the computer, the detector multiplexing means electrically interconnected to the detectors for selective activation of energy detection under control of the detector selection control signals; and
    the detector multiplexing means further having means to output analog signals produced by the selected detectors to the computer;
    whereby a reduced number of drivers can control the activation of a larger number of emitters in an opto-matrix input device.

2. An opto-matrix input device, as recited in claim 1, wherein:
    the detector multiplexing means is further comprised of a Y detector multiplexor to select a group of detectors corresponding to the group of detectors corresponding to the group of emitters selected by the Y emitter multiplexor means and an X detector multiplexor to select an individual detector from the group of detectors selected by the Y detector multiplexor and corresponding to the emitter selected by the X emitter multiplexor.

3. A system for detecting the position of an opaque point in an opto-matrix input device, comprising:
    a computer;
    at least one opto-matrix input device with a reduced number of driver components, the opto-matrix input device further comprising:
        a frame, the frame having a first vertical side, a second vertical side, a first horizontal side, and a second horizontal side;
        a plurality of Y emitter drivers for activating preselected groups of emitters;
        a plurality of X emitter drivers for activating preselected groups of emitters;
        a plurality of emitters, each requiring input from an active Y emitter driver and an active X emitter driver to emit energy, the emitters attached to the first horizontal side and the first vertical side such that energy beams from the emitters form a matrix;
        a plurality of detectors, each of the detectors corresponding to one of the plurality of emitters, the detectors attached to the second horizontal side and the second vertical side such that an energy beam from each of the corresponding emitters is detected by the detector which is paired with the corresponding emitter;
    emitter multiplexing means, the emitter multiplexing means having means to receive emitter selection control signals input to the emitter multiplexing means by the computer, the emitter multiplexing means electrically interconnected to the Y emitter drivers and X emitter drivers for selective activation of energy emission from the emitters under control of the emitter selection control signals, the emitter multiplexing means further including Y emitter multiplexor means and X emitter multiplexing means for selecting Y emitter drivers and X emitter drivers interconnected to the emitters such that each emitter in a group selected by the Y emitter driver has a different X emitter driver associated with it; and detector multiplexing means, the detector multiplexing means having means to receive detector selection control signals input to the detector multiplexing means by the computer, the detector multiplexing means electrically interconnected to the detectors for selective activation of energy detection under control of the detector selection control signals; and the detector multiplexing means further having means to output analog signals produced by the selected detectors to the computer;

whereby a reduced number of drivers can control the activation of a larger number of emitters in an opto-matrix input device.

4. A system, as recited in claim 3, wherein;

said detector multiplexing means is further comprised of Y detector multiplexor to select a group of detectors and an X detector multiplexor to select an individual detector form group of detectors selected by the Y detector multiplexor.

5. A system, as recited in claim 3, further comprising:

storage means for storing an ambient reference value for a selected one of the detectors paired with the emitters, the ambient reference value generated by activating the selected detector and deactivating its corresponding emitter;

comparison means, for comparing the ambient reference value with a measured signal generated immediately after the ambient reference is generated by activating the selected detector and activating its corresponding emitter;

whereby the computer can detect the presence of the opaque point by calculating the difference between the ambient reference value and the measured signal.

6. A method of detecting the position of an opaque point in a predetermined field of at least one opto-matrix input device under control of a separate computer, including the steps of:

emitting energy from a first horizontal side and a first vertical side with a plurality of emitters, each requiring input form an active X emitter driver and an active Y emitter driver to emit energy, such that energy beams from the emitters form a matrix;

detecting energy in the matrix with a plurality of detectors, each of the detectors corresponding to and paired with one of the plurality of emitters, the detectors being attached to the second horizontal side and the second vertical side such that an energy beam from each of the corresponding emitters is detected by the detector which is paired with the corresponding emitter;

multiplexing the emitters under control of selection control signals input to an emitter multiplexor by the computer, multiplexing further including multiplexing the Y emitter drivers with a Y emitter multiplexor to select a group of the emitters under control of the control signals and multiplexing the X emitter drivers with an X emitter multiplexor such that each emitter in the group of emitters selected by the Y emitter driver has a different X emitter driver associated with it;

multiplexing the detectors under control of selection control signals input to a detector multiplexor by the computer;

outputting signals produced by the detectors to the computer;

computing the location of the opaque point by detecting the absence of energy at selected detectors on the second horizontal side and the second vertical side when energy is emitted from the emitters paired with the selected detectors.

7. A method, as recited in claim 6, further including the steps of:

converting signals output by the selected detectors in each of the opto-matrix input devices to digital values with a computer having an analog to digital converter.

8. A method, as recited in claim 7, further including the steps of:

storing an ambient reference value generated by activating a selected one of the selected detectors and deactivating its corresponding emitter;

comparing the ambient reference value with a measured signal generated immediately after the ambient reference is generated by activating the selected detector and activating its corresponding emitter;

detecting the presence of the opaque point by calculating the difference between the ambient reference value and the measured signal.

* * * * *